(12) United States Patent
Kumar et al.

(10) Patent No.: US 9,860,909 B2
(45) Date of Patent: Jan. 2, 2018

(54) TENTATIVE GRANT FOR EFFICIENT DEVICE-TO-DEVICE COMMUNICATIONS

(71) Applicant: Intel IP Corporation, Santa Clara, CA (US)

(72) Inventors: Utsaw Kumar, Santa Clara, CA (US); Qinghua Li, San Ramon, CA (US); Huaning Niu, Milpitas, CA (US)

(73) Assignee: Intel IP Corporation, Santa Clara, CA (US)

( * ) Notice: Subject to any disclaimer, the term of this patent is extended or adjusted under 35 U.S.C. 154(b) by 390 days.

(21) Appl. No.: 14/581,770

(22) Filed: Dec. 23, 2014

(65) Prior Publication Data

US 2015/0327296 A1  Nov. 12, 2015

Related U.S. Application Data

(60) Provisional application No. 61/990,688, filed on May 8, 2014.

(51) Int. Cl.
  *H04W 72/12* (2009.01)
  *H04W 76/02* (2009.01)
  *H04W 72/14* (2009.01)

(52) U.S. Cl.
  CPC ... *H04W 72/1247* (2013.01); *H04W 72/1242* (2013.01); *H04W 72/14* (2013.01); *H04W 76/023* (2013.01); *H04W 72/1231* (2013.01)

(58) Field of Classification Search
  CPC . H04W 88/10; H04W 72/1247; H04W 72/10; H04W 88/06; H04W 72/1215;

(Continued)

(56) References Cited

U.S. PATENT DOCUMENTS

2013/0012221 A1* 1/2013 Zou ............... H04W 72/10
                                                455/452.1
2014/0185529 A1* 7/2014 Lim ............... H04W 76/023
                                                370/328

FOREIGN PATENT DOCUMENTS

KR     2013/0100807      9/2013
WO   WO 2013/191360   12/2013

(Continued)

OTHER PUBLICATIONS

Fujitsu, 'RRM for D2D communication', R1-140197, 3GPP TSG RAN WG1 Meeting #76, Prague, Czech Republic, Feb. 1, 2014 See pp. 1-4.

(Continued)

*Primary Examiner* — Redentor Pasia
*Assistant Examiner* — Peter Mak
(74) *Attorney, Agent, or Firm* — Thorpe North & Western

(57) ABSTRACT

Technology for efficient distributed scheduling is provided using tentative grants. A UE can receive a transmission request from a Tx UE, and from additional Tx UEs. Each Tx request can include a priority level of the transmitter UE sending the transmission request, to form a priority list. An incompatible list can be formed based on a signal to interference ratio of each transmitter with the UE. A grant message and the incompatible list can be transmitted for n−1 iterations from selected UEs based on the priority list and incompatible list. A tentative bandwidth grant can then be transmitted at an $n^{th}$ iteration to tentatively allow the transmitter UE to send a D2D communication to the UE in the bandwidth grant.

21 Claims, 11 Drawing Sheets

(58) Field of Classification Search
CPC ......... H04W 72/1221; H04W 72/1242; H04W 76/023; H04W 72/14; H04W 72/1231
See application file for complete search history.

(56) References Cited

FOREIGN PATENT DOCUMENTS

| | | |
|---|---|---|
| WO | WO 2014/063094 | 4/2014 |
| WO | WO 2015/171245 | 11/2015 |

OTHER PUBLICATIONS

Intel Corporation, 'Discussion on D2D operation within network coverage (mode-1)', R1-141164, 3GPP TSG RAN WG1 Meeting #76bis, Shenzen, China, Mar. 22, 2014, See pp. 1-3.
X. Wu, S. Tavildar, et al. "FlashLinQ: A Synchronous Distributed Scheduler for Peer-to-Peer Ad Hoc Networks." IEEE Transactions on Networking, pp. 1215-1227, vol. 21, No. 4, Aug. 2013.z.

* cited by examiner

TENTATIVE GRANT FOR EFFICIENT DEVICE-TO-DEVICE COMMUNICATIONS

RELATED APPLICATIONS

The present application claims priority to U.S. Provisional Patent Application No. 61/990,688, filed May 8, 2014, the entire specification of which is hereby incorporated by reference in its entirety for all purposes.

BACKGROUND

Device to Device (D2D) communication can be used to dramatically increase data rates and system capacity in a cellular wireless network by enabling direct communication between mobile stations. Various proximity-based applications and services can be configured to operate using D2D. Unicast D2D communications is expected to play a vital role in next generation communications systems. With the increasing density of users, the problem of scheduling and interference management is very challenging. The problem becomes even more challenging in the absence of a centralized entity that manages contention and scheduling of devices operating using D2D.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
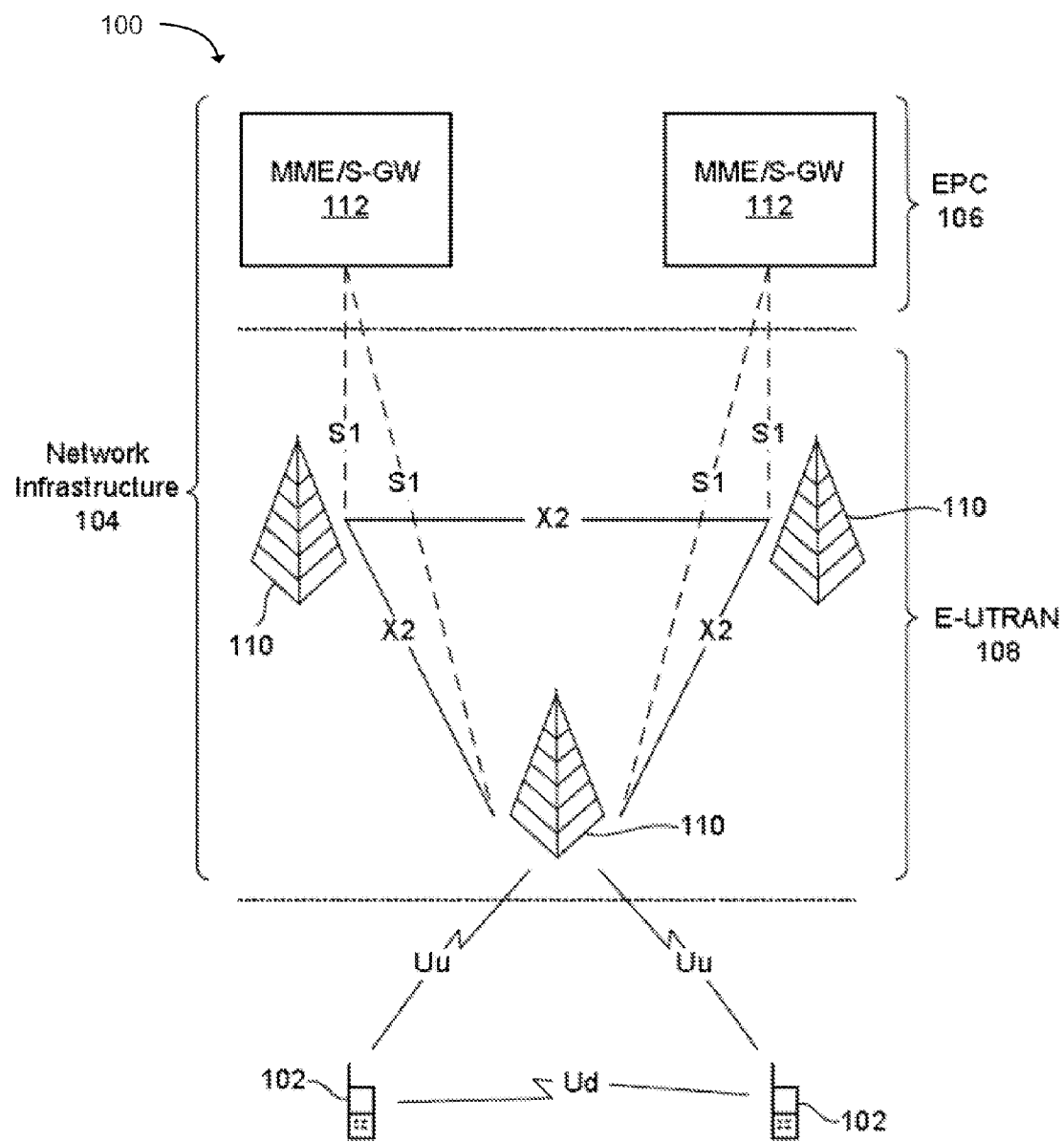
FIG. 1 is a schematic diagram illustrating a wireless communication system and environment in accordance with examples disclosed herein.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

It can be shown that distributed scheduling becomes optimal as the density of users increases. Such distributed scheduling can also be useful in the case of an emergency when a centralized scheduling entity, such as an evolved Node B (eNB) is not working. However, the use of distributed scheduling can use a significant amount of overhead, especially in systems with a high density of users. For instance, in a conventional contention scheme, referred to as FlashLinQ, for N bandwidth grants, it takes at least 2N blocks or segments to schedule the bandwidth grants. As N becomes large, the overhead can become excessive.

In accordance with one embodiment, a distributed scheduling scheme can be used that significantly reduces the amount of overhead and allow D2D links with a lower priority to be scheduled simultaneously with higher priority D2D links, while controlling the interference the links cause to the higher priority users. As the number of iterations is increased, more D2D links can be scheduled, leading to higher spatial reuse and higher throughput. Achieving throughputs close to the upper bound typically requires a large number of iterations, which comes at a cost of high overhead. However, by making use of a tentative grant at lower priority links, throughputs close to the upper bound can be achieved with a relatively low number of iterations. This will be discussed further in the proceeding paragraphs.

Wireless mobile communication technology uses various standards and protocols to transmit data between a base station and a wireless communication device. Wireless communication system standards and protocols can include, for example, the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard, which is commonly known to industry groups as Wi-Fi. In a 3GPP radio access network (RAN) according to LTE, the base station is termed Evolved Universal Terrestrial Radio Access Network (E-UTRAN) Node B (also commonly denoted as evolved Node B, eNodeB, or eNB). It may communicate with a wireless communication device, known as user equipment (UE). Although the present disclosure is presented with terminology and examples generally directed towards 3GPP systems and standards, the teaching disclosed herein may be applied to any type of wireless network or communication standard.

FIG. 1 is a schematic diagram illustrating a communication system 100 that includes a plurality of UEs 102 in communication with network infrastructure 104. The network infrastructure 104 includes an evolved packet core (EPC) 106 and an E-UTRAN 108. The EPC 106 includes mobility management entities (MME) and serving gateways (S-GW) 112 that communicate with eNodeBs 110 in the E-UTRAN 108 over an S1 interface. The S1 interface as defined by 3GPP supports a many-to-many relation between EPC 106 and eNodeBs 110. For example, different operators may simultaneously operate the same eNodeB 110 (this is also known as "network sharing"). The E-UTRAN 108 is a packet switched 3GPP RAN for LTE (i.e., 3.9G) and LTE-Advanced (i.e., 4G) that was first introduced in 3GPP Release 8 and continues to evolve. In the E-UTRAN 108 the eNodeBs 110 are more intelligent than legacy Node Bs of a universal terrestrial radio access network (UTRAN) used in universal mobile telecommunication systems (UMTS or 3G). For example, almost all the radio network controller (RNC) functionality has been moved to the eNodeB rather than being in a separate RNC. In LTE, eNodeBs 110 are connected with each other by means of an X2 interface that allows the eNodeBs 110 to forward or share information.

The UEs 102 are in communication with an eNodeB 110 using a Uu air interface on a licensed cellular spectrum. The UEs 102 and eNodeB 110 may communicate control data and/or user data with each other. A downlink (DL) transmission in an LTE network can be defined as a communication from the eNodeB 110 to the UE 102, and an uplink (UL) transmission can be defined as a communication from the UE 102 to the eNodeB 110.

In addition to DL and UL transmissions over the Uu interface, the UEs 102 are also shown communicating directly with each other over a Ud air interface.

In D2D communication, a UE 102 is able to communicate directly with another UE 102 without routing communications via an eNodeB 110 or the core network (e.g., EPC 106), as illustrated by the Ud D2D interface in FIG. 1. D2D communications are of interest due to their ability to reduce load on a core network (such as the EPC 106) or a radio access network (such as the E-UTRAN 108), increase data rates due to direct and short communication paths, provide public safety communication paths, and provide other functionality. D2D has been proposed for use in local social networks, content sharing, location-based marketing, service advertisements, mobile-to-mobile applications, and other types of proximity services (ProSe).

There are in principle various alternatives to realize such a direct communication path between mobile devices. In one embodiment, the D2D air interface Ud can be realized by using a short-range communication technology, such as Bluetooth or Wi-Fi, or by reusing licensed spectrum used in cellular communication systems, such as 3GPP LTE or Wimax. When communicating via licensed spectrum, uplink (UL) spectrum is often used to minimize interference with relatively powerful downlink signals communicated by the eNodeB.

D2D communications can be generally divided into two parts. The first part is proximity detection (or device discovery) whereby UEs 102 are able to determine that they are within range for D2D communication. Proximity detection may be assisted by network infrastructure 104, may be performed at least partially by the UEs 102, or may be performed largely independent of the network infrastructure 104. The second part is direct communication, or D2D communication, between UEs 102, which includes a process to establish a D2D session between UEs 102 as well as the actual communication of user or application data. D2D communication using licensed spectrum may or may not be under continuous control of a mobile network operator (MNO). For example, the UEs 102 may not need to have an active connection with an eNodeB 110 in order to take part in D2D communications.

A basic problem in wireless communication is reducing interference or managing contention so that wireless devices do not transmit in a same time/frequency that can cause interference. If a connection with a RAN or core network is maintained, the RAN or core network can be used to assist in controlling communications between UEs to avoid interference. However, when centralized coordination is infeasible, distributed contention can be used to control channel access and reduce or eliminate interference. For example, if users are operating outside the coverage area of a cellular network, or travel outside the coverage area while communicating via D2D communication, the D2D configured devices may need to contend for transmission time. With the foregoing in mind, Applicants have recognized that contention overhead is one of the limiting factors for D2D communications and have identified a need for improved efficiency for distributed contention.

In distributed scheduling of transmission times, wireless devices such as UEs can be assigned unique priority values. The priorities can then be used to determine when each UE is assigned an opportunity to transmit, thereby reducing or eliminating contention for the same transmission time. In conventional scheduling schemes, such as in Qualcomm's FlashLinQ, a transmission request needs to be sent multiple times over multiple iterations for scheduling parallel D2D links sharing the same channel with high spatial reuse. Qualcomm's FlashLinQ architecture is disclosed in "FlashLinQ: A Synchronous Distributed Scheduler for Peer-to-Peer Ad-hoc Networks," X. Wu, S. Tavildar, S. Shakkottai, T. Richardson, J. Li, R. Laroia, A. Jovicic, IEEE/ACM Transaction on Networking, August 2013.

In FlashLinQ, once the receiver of a D2D link acquires the channel (with the highest priority among all unscheduled links), it broadcasts a grant message to all UEs within its range, communicating that the UE grants the channel for communication by its transmitter. After receiving the grant, the receiver of an unscheduled D2D link (even with the highest priority) cannot grant the channel to its transmitter because the receiver does not know whether its transmitter would cause an unacceptable interference to the scheduled links. The receiver has to wait for its transmitter to check the compatibility and send the transmission request again or give up the contention. The act of giving up the contention to another D2D link is referred to as yielding.

Applicants have noticed and herein disclose systems and methods where transmission requests may be sent a reduced number of times for scheduling the parallel D2D links, while maintaining a substantially optimal data throughput relative to a theoretical upper bound. In one embodiment, the receiver that just acquired the channel can be configured to check the compatibility for the unscheduled transmitters and specifies the incompatible transmitters in the grant message, thereby creating an enhanced grant message. After receiving the enhanced grant message, unscheduled receivers with the highest priority can send grant messages right away without waiting for additional requests from a corresponding transmitter. In one embodiment, the grant messages that include indications of incompatible transmitters consume the same resources as the original grant message and may lead to reductions in contention overhead by about 30-40%, or greater relative to conventional scheduling schemes, such as the existing FlashLinq architecture.

In one embodiment, teachings of the present disclosure may be used as an improvement to the existing FlashLinQ architecture. In one embodiment, teachings of the present disclosure may be used in a unique new contention scheme completely separate from or independent of the FlashLinQ architecture. Although various examples are given in relation to and in comparison with the FlashLinQ architecture, one of skill in the art will recognize the applicability of the present disclosure to other architectures and communication protocols.

In one embodiment, a UE includes a request receipt component, an interference component, and a grant/deny component. The request receipt component is configured to receive a first signal indicating a request to transmit to the UE from a first transmitting UE and to receive one or more additional signals indicating that one or more additional transmitting UEs are requesting to transmit to corresponding target UEs. The interference component identifies, based on a received power of the first signal and the one or more additional signals, one or more incompatible UEs. The incompatible UEs may include at least one of the one or more additional transmitting UEs. The grant/deny component is configured to send a grant signal indicating a grant to the first transmitting UE and further indicating a block on transmission by the one or more incompatible UEs.

Figure 2:
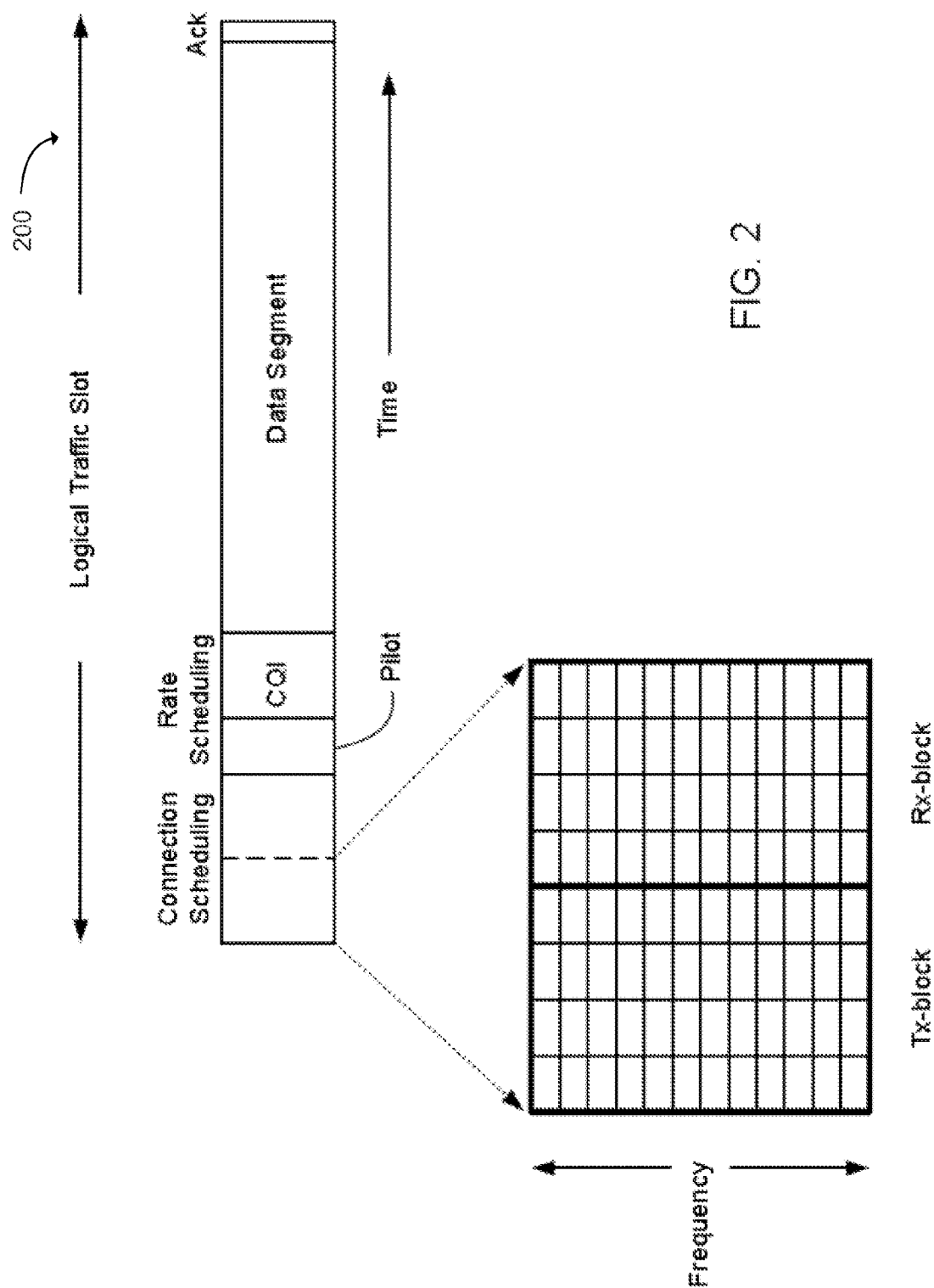
FIG. 2 is a schematic diagram illustrating a logical traffic slot in accordance with examples disclosed herein.

FIG. 2 illustrates one embodiment of a logical traffic slot 200, as discussed in the FlashLinQ architecture. Please note that the teaching provided herein may be used to modify FlashLinQ architecture or may be used in a completely independent architecture. Discussion of FlashLinQ architecture is provided by way of illustration and background only. In one embodiment, the logical traffic slot 200 includes a smallest segment of resources that may be scheduled by a mobile terminal or UE. In the depicted embodiment, the logical traffic slot 200 may include a plurality of orthogonal frequencies and a length of time. For example, the logical traffic slot 200 may have a length of about 2 milliseconds (ms). The logical traffic slot 200 is divided into various segments, including a connection scheduling segment, a rate scheduling segment, a data segment, and an acknowledgment (Ack) segment. In one embodiment, the connection scheduling segment is used for scheduling transmissions for the data segment and is where channel contention is performed and resolved. The rate scheduling segment may include pilots (Pilot) from scheduled transmitters and channel quality indicators (CQI) from receivers. The data segment may include a block of time and/or resources during and/or within which scheduled transmissions take place. The Ack segment may be used to acknowledge successful reception of data sent during the data segment.

In one embodiment, channel contention occurs during the connection scheduling segment. A simplified explanation of connection scheduling and channel contention will be provided for clarity. The connection scheduling segment is divided into separate blocks, including a transmission request block (Tx-request block) and a bandwidth grant block. Each block is shown divided into a plurality of units called symbols or tones. In one embodiment, each symbol or tone corresponds to a D2D UE or a D2D link between UEs. During the Tx-request block each D2D UE that wishes to transmit sends power on its corresponding tone, which indicates a transmission request for the current logical traffic slot. During the bandwidth grant block, the receiver UE for the highest priority D2D UE or D2D link responds with a grant. The grant may include sending power on a tone corresponding to its requesting D2D UE. In one embodiment, a series of alternating Tx-request blocks and bandwidth grant blocks (e.g., see FIG. 3, discussed below) is performed until all links that can be scheduled are scheduled. Subsequent rate scheduling during the rate scheduling segment, data transmission during the data segment, and acknowledgments during the Ack segment are then performed during the logical traffic slot 200.

The above embodiments are given by way of example only. Further details and example embodiments will be discussed below.

Figure 3:
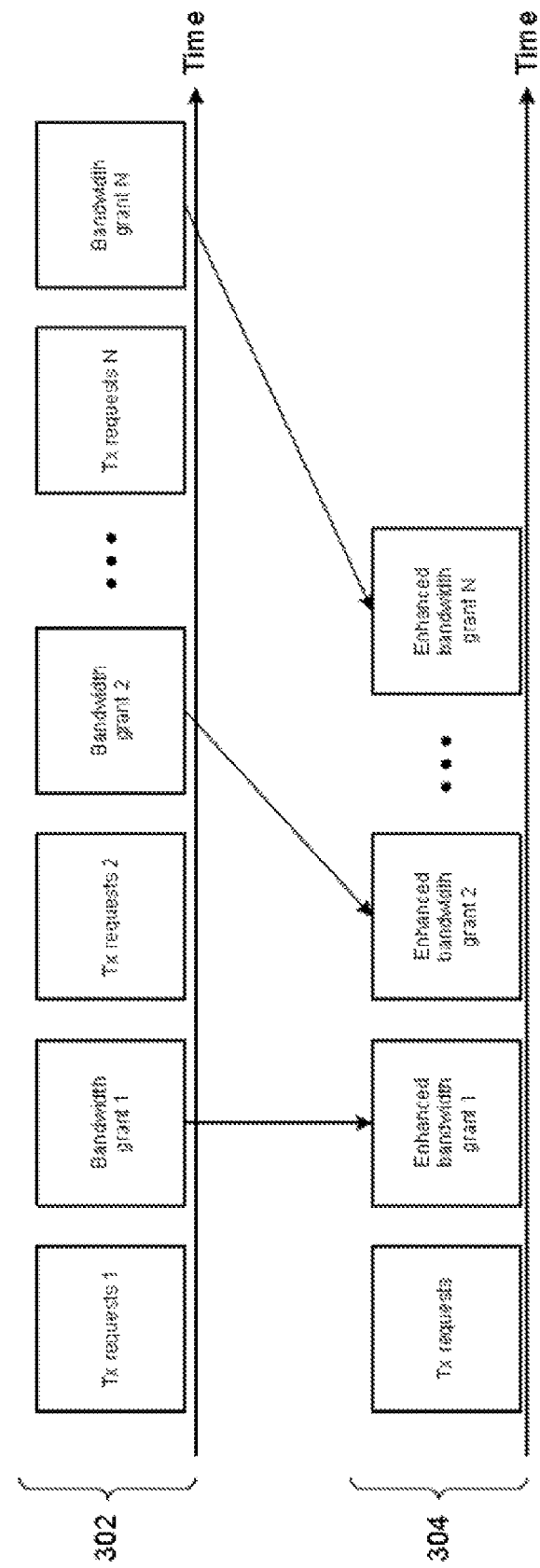
FIG. 3 is a schematic diagram illustrating channel contention in accordance with examples disclosed herein.

FIG. 3 illustrates methods for channel contention including conventional channel contention 302 (e.g., FlashLinQ) and enhanced channel contention 304. Each scheme is illustrated with a plurality of blocks, each representing either a Tx-request block or a bandwidth grant block. In some situations, different structures for Tx requests and Rx requests may be used.

In the conventional channel contention 302, there is at least one Tx request for each bandwidth grant. For example, for N bandwidth grants, it takes at least 2N blocks or segments. In the enhanced channel contention 304, it takes N+1 blocks or segments because only a single Tx request block may be needed. In some situations more than one Tx-request block may be needed to allow for all D2D UEs that desire to transmit to send at least one transmission request. However, the number of Tx-request blocks is still a fixed number and will be N+x wherein N is the number of grants and x is the number of Tx-request blocks to allow each transmitting UE to send one Tx request. Thus, as illustrated, the enhanced channel contention 304 removes the additional transmission requests and can lead to a significant reduction in overhead.

Figure 4:
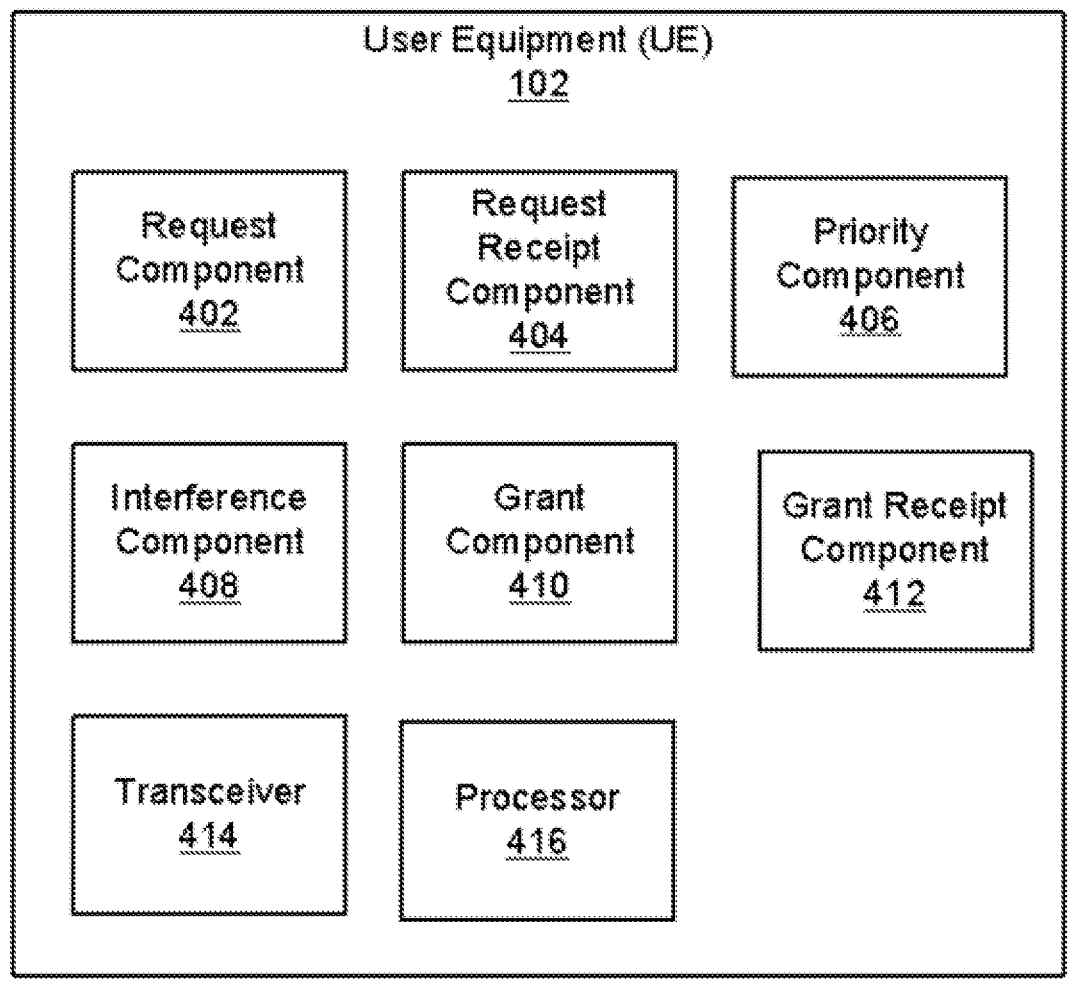
FIG. 4 is a schematic block diagram illustrating one embodiment of a mobile communication device in accordance with examples disclosed herein.

Turning to FIG. 4, a block diagram of a UE 102 configured to perform efficient channel contention is illustrated. The UE 102 includes a request component 402, a request receipt component 404, a priority component 406, an interference component 408, a grant/deny component 410, a grant receipt component 412, a transceiver 414, and a processor 416. The components 402-416 are shown by way of example and may not all be included in all embodiments. In some embodiments, only one or any combination of two or more of the components 402-416 may be included. In one embodiment, the UE 102 is configured to operate as a transmission UE or a reception UE, as desired for a D2D link or for current communication needs.

The request component 402 is configured to transmit a transmission request to a target UE (or reception UE). In one embodiment, the request component 402 transmits a transmission request in response to determining that the UE 102 has data to transmit over a D2D link to a peer UE. The request component 402 may send the transmission request over a D2D link to the peer UE during a Tx-request block during connection scheduling. In one embodiment, the request component 402 may send the transmission request by sending power on a tone of a tone matrix, such as a tone in the Tx-request block of FIG. 2. In one embodiment, other UEs within a range of the UE 102 may send transmission requests during the Tx-request block on different tones. Because the tones can be distinguished, the nearby UEs involved in D2D communication will be able to distinguish which of the UEs are requesting transmission. In one embodiment, the request component 402 is configured to send a single transmission request for each connection scheduling or logical traffic slot. For example, only a single transmission request may need to be sent to obtain or yield a channel during each traffic slot. In one embodiment, the UE 102 may wait and listen during a plurality of bandwidth grant blocks without transmitting additional transmission requests. In one embodiment, the request component 402 sends the transmission request at an optimal link power, such as a power that will be used for data transmission on the link.

The request receipt component 404 is configured to receive transmission requests transmitted by one or more peer UEs. In one embodiment, the request receipt component 404 receives transmission requests from a peer UE that is part of a D2D session with the UE 102. For example, the request receipt component 404 may receive a signal that indicates a request by the peer UE to transmit data to the UE 102. In one embodiment, the request receipt component 404 may receive transmission requests from unconnected UEs. For example, nearby UEs may request to connect to respective target UEs, and the request receipt component 404 may receive these requests. Although the nearby UEs may be requesting to transmit to a different UE, the UE 102 may use this information for channel contention. For example, the UE 102 may be able to determine whether there are higher priority UEs (or UEs corresponding to higher priority D2D links) that have not yet been scheduled. In one embodiment, the received power or other information included in the transmission requests, such as transmitted power, may be stored for later use.

The priority component 406 is configured to determine a priority for the UE 102 and/or one or more nearby UEs. In one embodiment, the priority component 406 determines the priorities based on a predetermined algorithm so that other nearby UEs can determine the same priorities. For example, the links between UEs may be prioritized such that a high priority link can acquire the channel before the low priority ones. Lower priority links (or UEs that are a part of a low priority link) may wait to schedule a grant message until all higher priority links are scheduled, yield, or are blocked from transmission. In FlashLinQ, if a low priority link predicts that it will cause unacceptable interference to a scheduled high priority link, the low priority link will give up in channel contention, i.e., yield.

In one embodiment of the present application, the priority for each of the UEs can be determined based on a predetermined algorithm, such as a random number generator and a common seed. For example, all UEs may know the priority for all other UEs within radio proximity. In one embodiment, a UE is configured to determine a priority for its own link (or the priority of a requesting UE) as well as a priority for other UEs that send transmission requests to other corresponding target UEs. In one embodiment, the priority component 406 may determine which tone of a tone matrix (such as a tone of the Tx-request block and bandwidth grant block of FIG. 2) corresponds to which UE. In one embodiment, the priority component 406 may determine the priority of another UE or D2D link based on the tone used for a transmission request.

The interference component 408 is configured to identify one or more UEs with a high likelihood to cause substantial interference during a concurrent D2D transmission. For example, the interference component 408 may detect a received power for a transmission request from a source UE that is requesting to transmit to the UE 102, as well as for transmission requests that have been sent to other UEs and that belong to other D2D links within radio proximity of the UE. The transmission powers or received powers may then be used to estimate a signal to interference ratio (SIR) in case the source UE and other transmitting UEs transmit at the same time. In one embodiment, the interference component 408 estimates the SIR based on the transmission requests sent during the Tx-request block of FIG. 2. In one embodiment, the interference component 408 may store an indication of one or more nearby UEs that should be blocked from transmission if UE 102 obtains the channel. The nearby UEs may be blocked if their SIR is greater than a selected threshold and their priority is less than the priority of the UE.

The grant/deny component 410 is configured to send a grant signal indicating that a source UE will be allowed to transmit during the traffic slot. In one embodiment, the grant signal indicates to a requesting UE that it has permission to transmit. The grant signal may include a tone matrix where the grant/deny component 410 sends power on a tone corresponding to the UE that has been granted permission to transmit. For example, the grant signal may include power on a tone of one of the tones of the bandwidth grant block of FIG. 2. The corresponding UE may receive the grant signal and know that it has been granted permission to transmit during the data segment of the traffic slot.

In one embodiment, the grant signal may also include an indication of one or more UEs (or D2D links) that are blocked from transmitting. For example, the grant signal may indicate that one or more UEs that will interfere, as determined by the interference component 408, are blocked from transmitting. This block on transmission limits other UEs from transmitting and causing interference with the granted UE or link. In one embodiment, the grant signal includes a tone matrix where the grant/deny component 410 sends power on a tone corresponding to UEs that have been blocked or banned from transmission. For example, the grant signal may include power on one or more tones of the bandwidth grant block of FIG. 2 to indicate that those UEs have been blocked. Thus, a single bandwidth grant block (or other grant message) may be used to grant a channel to one UE and deny transmission to one or more other UEs. In one embodiment, other UEs can determine which UEs are granted or blocked based on priority. For example, a highest priority tone on which power is sent may be interpreted as a grant, while any lower priority tones may be interpreted as a block or denial for transmission. In one embodiment, instead of having a single tone for each UE, a tone matrix may include double tones (e.g., a grant tone and a deny tone) for at least one UE.

In one embodiment, the grant/deny component 410 is configured to determine whether to grant access to a channel to a requesting UE. The grant/deny component 410 may determine whether to grant the channel based on one or more of a priority, grant messages with grant and/or block indications, and estimated SIR for the channel. In one embodiment, the grant/deny component 410 may determine that the channel should be granted based on a D2D link having the highest priority. For example, if a D2D link or UE has a higher priority than all UEs that sent transmission requests, the grant/deny component 410 may determine that the channel should be granted and send a grant message (which may include one or more block indications denying transmission to one or more other UEs). In one embodiment, if the UE is not the highest priority requesting UE, the grant/deny component 410 also determines whether to grant the channel based on previous grant messages as well as any block indications. For example, if a grant message was previously sent by another reception UE, the grant/deny component 410 may take into account that the corresponding UE has already been granted the channel and will not send any more grant messages. Similarly, the grant/deny component 410 may determine which UEs or links have been disabled or denied in the previous grant message(s).

Based on the grant and block indications, the grant/deny component 410 can determine whether its D2D link can still be granted (e.g., has not received a block indication for the channel) and whether there are any other higher priority UEs that have not yet been granted the channel or explicitly denied the channel. If there are no higher priority UEs remaining, and a corresponding D2D link has not been explicitly disabled, the grant/deny component 410 may determine that it should send a grant message.

In one embodiment, the grant/deny component 410 may also estimate a SIR for the channel based on transmission requests and/or one or more grant messages that have been sent. For example, the grant/deny component 410 may determine that a SIR would be too high based on all the other transmitting UEs and may yield the channel. Similarly, the grant/deny component 410 may determine that the SIR is within an acceptable range and send a grant message that includes a grant indication and may also include one or more block indications, such as a block for lower priority UEs that have a SIR level greater than a selected threshold.

In one embodiment, the grant/deny component 410 is configured to base all determinations on whether to grant or deny a transmission request from the UE based on any transmission requests received during one or more initial transmission request blocks so that requesting UEs are not required to send their transmission requests more than one time during connection scheduling for a traffic slot.

For example, a first grant message may be sent by a first UE and a second grant message may be sent later by a second UE without any transmission request sent between the first grant message and the second grant message. For instance, one or more preliminary Tx-request blocks may be followed by sequential bandwidth grant blocks without any additional Tx-request blocks. In one embodiment, the ratio of grant messages (or bandwidth grant blocks) to transmission requests per device (or Tx-request blocks) is greater than one-to-one (1:1). For example, a single Tx-request block may include a plurality of transmission requests. However, in one embodiment, only one transmission request may be sent per UE because repeat transmission requests may not be needed. In one embodiment, a ratio of bandwidth grant blocks to Tx-request blocks may be at least 3:2, at least 2:1, or greater. In one embodiment, the ratio of bandwidth grant blocks to Tx-request blocks may be 3:1 or greater.

In one embodiment, the grant/deny component 410 may send the grant message (e.g., a tone matrix) at a power different from optimal link power, such as a maximum transmit power or full power to reach as many UEs as possible and/or to maximize the probability that the grant message is received. For example, sending the grant message at a higher power may help ensure that reception UEs corresponding to transmission UEs receive the grant message (and any included block indications). In one embodiment, the grant/deny component 410 may send the grant message at a power different from the transmission requests, such as a power greater than the transmission power for a corresponding transmission request.

In one embodiment, the grant/deny component 410 may send a deny message without any explicit indication of a grant. For example, the grant/deny component 410 may send a deny message that indicates which links or UEs are incompatible with a corresponding parent UE or link. For example, the grant of the channel may be implied such that there is no need to explicitly grant the channel. Because multiple links can be disabled during a grant block while, generally, only one link could be granted during the same grant block, implied grants with explicit denials can lead to more efficient channel contention. In one embodiment, the grant of the channel may be implied to a corresponding link UE and any other nearby UEs by the fact that a UE is transmitting the deny message.

The grant receipt component 412 receives a grant message. The grant message may include a grant indication and one or more block indications, as discussed above. In one embodiment, the grant message may store information regarding the grant message for later usage. For example, the information may be used to determine whether to send a grant message, whether the UE has been denied a request to transmit on the channel, or the like. In one embodiment, the grant receipt component 412 is configured to listen for grant messages during a plurality of sequential bandwidth grant blocks. For example, the grant receipt component 412 may listen for grant messages without the UE 102 transmitting additional transmission requests. In one embodiment, the grant receipt component 412 may receive a grant message that indicates that one or more higher priority UEs have been granted the channel and/or denied the channel. In one embodiment, the grant receipt component 412 determines, based on a grant message, whether a parent UE, corresponding UE, or D2D link has been denied or granted the channel.

In one embodiment, the grant message can be conveyed for n iterations, where n is a positive, non-zero integer. The operations j=1, . . . , n−1 can function as described in the preceding paragraphs. For the last iteration, j=n, a tentative grant can be communicated. All receivers that did not get a chance to send the bandwidth grant in the previous iterations can tentatively grant the channel if an interference threshold, such as a signal to interference value threshold at the receiver for its own signal is satisfied. The transmitter can then determine whether to transmit or not based on all of the bandwidth grants it has received. The transmitter will not transmit if it is deemed incompatible by a higher priority link. This will be more fully described in the proceeding paragraphs.

The transceiver 414 may include an antenna and circuitry for sending and receiving wireless signals. For example, the transceiver 414 may include a wireless radio that is configured to operate on a licensed or unlicensed spectrum. In one embodiment, the transceiver 414 may be configured to operate based on one or more protocols such as a Bluetooth protocol, 3GPP protocol, Wi-Fi protocol, Wi-Max protocol, or any other protocol. In one embodiment, the transceiver 414 may send and receive signals for other components 402-412 and 416 of the UE 102.

The processor 416 may include any general-purpose or specialized processor. In one embodiment, the processor 416 may process information provided by or stored by one or more of the other components 402-414 of the UE 102. In one embodiment, one or more of the other components 402-414 may include code stored in a computer-readable medium which is executed by the processor 416.

Figure 5:
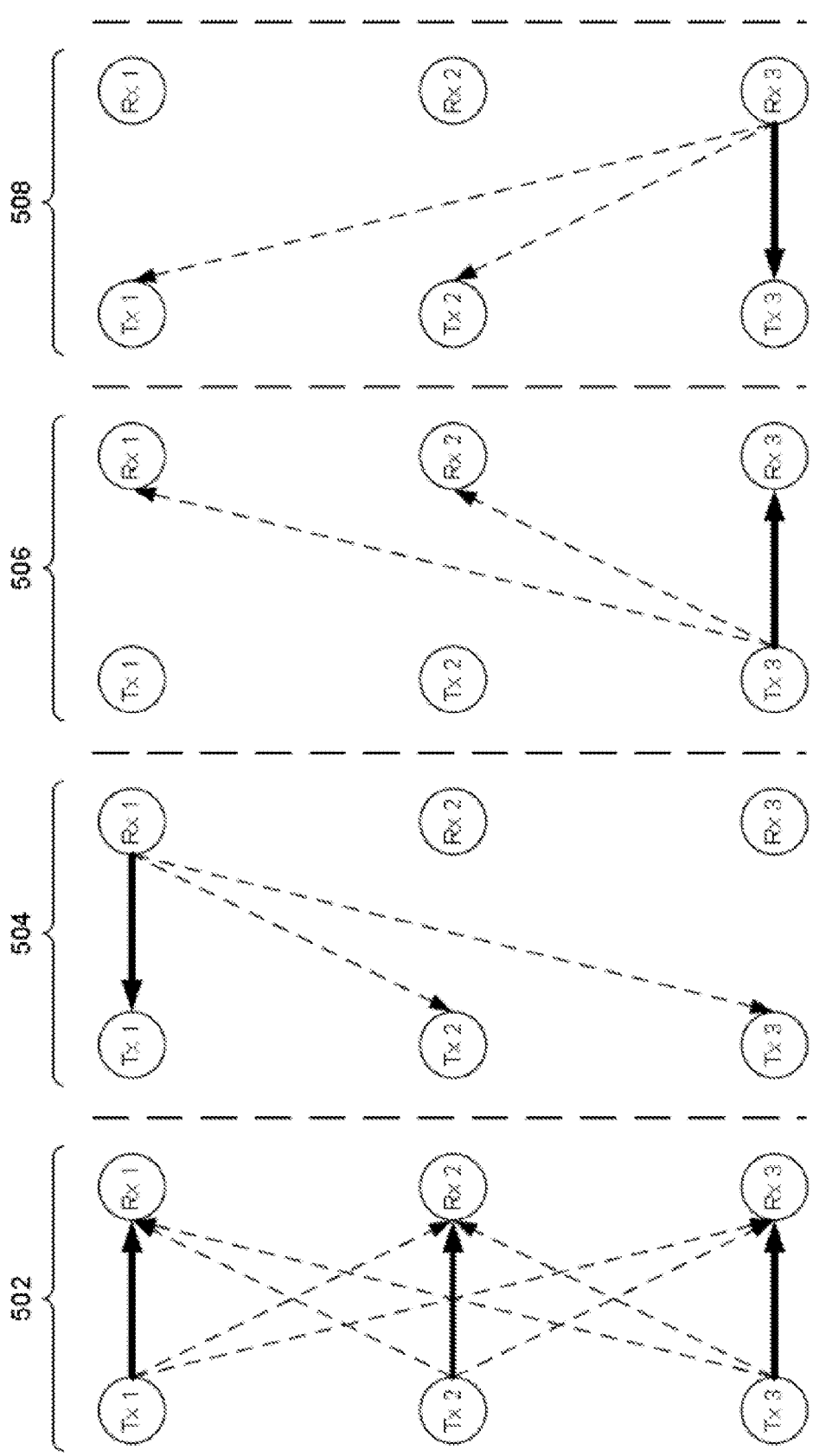
FIG. 5 is a schematic diagram illustrating channel contention.

FIG. 5 is a schematic diagram illustrating conventional contention, e.g., using FlashLinQ architecture and methods. FIG. 5 illustrates communication for a plurality of transmission devices (Tx 1, Tx 2, Tx 3) and reception devices (Rx 1, Rx 2, Rx 3) during a plurality of time periods including a first time period 502, a second time period 504, a third time period 506, and a fourth time period 508. In one embodiment, the first time period 502 and third time period 506 correspond to a Tx-request block where transmission requests are sent. In one embodiment, the second time period 504 and fourth time period 508 correspond to bandwidth grant blocks where grant messages are sent. Solid lines indicate transmissions sent over a D2D link to a peer or connected device, while dotted lines indicate that the transmission may also be received by devices other than a connected or linked device.

In FIG. 5, three links are contending for transmission: link 1, which includes Tx 1 and Rx 1; link 2, which includes Tx 2 and Rx 2; and link 3, which includes Tx 3 and Rx 3. Link 1 and link 3 can run in parallel because they are far apart and the mutual interference is weak (i.e., SIR is sufficiently high). Link 2 cannot run in parallel with link 1 or link 3. The transmission priorities from high to low are link 1, link 2, and link 3, in that order. In other words, link 2 should yield if needed by link 1, and link 3 should yield if needed by link 2. In the first time period 502, the transmitters Tx 1, Tx 2, and Tx 3 send transmission requests indicating that they wish to transmit during the current, or upcoming, traffic slot. The receivers Rx 1, Rx 2, and Rx 3 receive the requests from corresponding transmitters as well as from transmitters corresponding to the other links. Based on the requests, the transmitters will grant bandwidth (or the channel) based on priority. In the second time slot 504, Rx 1, which has the highest priority, grants the channel to Tx 1. Measuring the received power of this grant message, Tx 2 knows it would cause too much interference to Tx 1 if Tx 2 transmitted in parallel with Tx 1. Therefore, Tx 2 gives up (i.e., yields) and does not send a transmission request in the third time period 506. Since Tx 3 does not expect strong interference to Rx 1, based on measuring the received power of Rx 1's grant message, Tx 3 contends again by sending a transmission request in the third time period 506. Finally, Rx 3 grants the channel to Tx 3 in the fourth time period 508.

Figure 6:
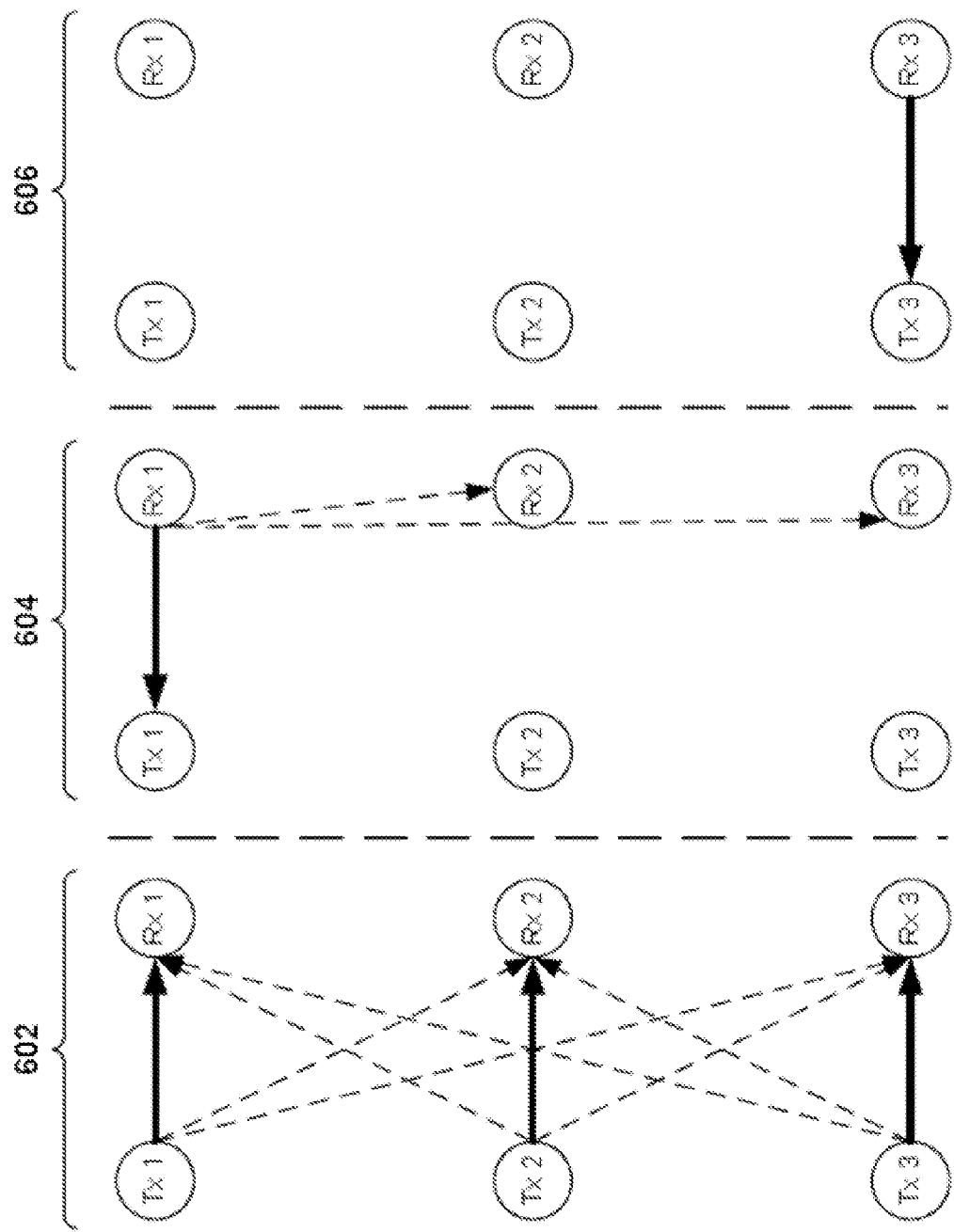
FIG. 6 is a schematic diagram illustrating one embodiment of efficient channel contention in accordance with examples disclosed herein.

FIG. 6 is a schematic diagram illustrating enhanced contention or more efficient contention, as disclosed herein. A plurality of transmission devices (Tx 1, Tx 2, Tx 3) and reception devices (Rx 1, Rx 2, Rx 3) are shown communicating during a plurality of time periods including a first time period 602, a second time period 604, and a third time period 606. In one embodiment, the first time period 602 corresponds to a Tx-request block where transmission requests are sent by the transmitter UEs, Tx 1, Tx 2, and Tx 3. In one embodiment, the second time period 604 and third time period 606 correspond to iterations of bandwidth grant blocks where grant messages are sent. In this example, there are n=2 iterations of bandwidth grant blocks when grant messages are sent, where n is a positive non-zero integer. Solid lines indicate transmissions sent over a D2D link to a peer or connected device, while dotted lines indicate that the transmission may also be received by devices other than a connected or linked device.

In one embodiment, the new contention scheme is different from the conventional in that transmitters do not need to participate in the contention again and again (i.e., send multiple transmission requests for the same traffic slot). Rather, the receivers can be configured to talk to each other directly to decide which links can run simultaneously. As illustrated in FIG. 6, the transmitters Tx 1, Tx 2, and Tx 3 can send transmission requests in the first time period 602, similar to the conventional contention scheme.

In the second time period 604, Rx 1 (with the highest priority) does more than in the conventional scheme. Specifically, Rx 1 not only grants the channel to its transmitter, Tx 1, but also blocks the transmission of Tx 2. Because Rx 1 can measure the interference from Tx 2 (e.g., during the first time period 602) by checking the received power of Tx 2's transmission request, Rx 1 can determine that the signal to interference ratio (SIR) is greater than a selected threshold, thereby making link 1 (between Rx 1 and Tx 1) incompatible with link 2 (between Rx 2 and Tx 2). Therefore, Rx 1 can block Tx 2 proactively instead of waiting for Tx 2 to check the interference level and yield. Because this determination is done by Rx 1 and transmitted in the grant message, all the links (and receivers) know that Tx 2 has been denied.

In the third time period 606 (i.e. n=2, since Rx 3 knows Tx 2 was blocked by Rx 1, Tx 3 has the highest priority among all the unscheduled links. If the interference from Tx 1 is below a threshold, Rx 3 grants the channel to Tx 3 so that link 1 and link 3 can run in parallel. Thus, the new scheme allows the same number of links to be scheduled faster (in fewer time periods) than the conventional scheme. For example, the contention in FIG. 6 is about 25% faster than the contention in FIG. 5. As the number of links increases, the percentage speed increase may continue to improve. This can lead to significant control overhead savings. In some situations, the percentage speed increase may exceed 30%, exceed 40%, and/or approach 50%.

Figure 7:
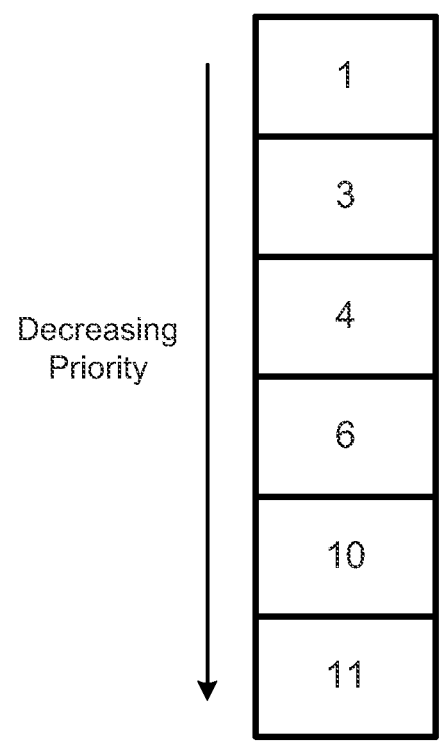
FIG. 7 is a schematic block diagram illustrating a priority list in accordance with examples disclosed herein.

FIG. 7 provides an example illustration of a cell with 11 links. In this example, there are 11 potential links between UEs. UEs desiring to transmit are referred to as transmitter UEs. The UEs to which the transmitter UEs will communicate are referred to as receiver UEs. Each UE can be configured to both transmit and receive.

In the example of FIG. 7, Receiver UEs 1, 3, 4, 6, 10 and 11 have each received a transmission request and have been assigned a priority level. Each receiver UE is aware of the other receiver UE's priority level. In addition, each UE is also aware of potential interference that may be caused by other UEs, based on the SIR levels determined when the transmission requests were communicated. The receiver UEs are configured to send a bandwidth grant message to their respective transmitter UEs based on the rules described in FIG. 4. Receiver 6 is configured to expect link 1 to send its bandwidth grant. In the send iteration, receiver 6 can receive an indication that receivers 3 and 4 are blocked by receiver 1 in its bandwidth grant, so 6 can jump ahead and transmit a bandwidth request in the send iteration.

If a sufficient number of bandwidth grants are allowed, then relatively tight spatial packaging can be achieved within a cell. However, this scheme may not perform well if the number of iterations is very small (i.e. 1 to 2 iterations). While the example in FIG. 6 reduces overhead compared with the example of FIG. 5, additional improvements can be made to further reduce overhead and increase the cell average throughput closer to the theoretical upper bound.

Consider the case when the number of iterations is 1 (i.e. n=1). In the priority list illustrated in FIG. 7, only link 1 will be scheduled at the first iteration of the bandwidth grant message. Even if link 1 shuts down links 3 and 4, by the time link 6 comes to know of this information, the bandwidth grant phase is over. This is true for all such priority lists. A receiver is scheduled if and only if it is at the top position in its priority list when the number of iterations is equal to 1. This situation can be worse. For example, each subsequent receiver k can have receiver k−1 listed at the top of its priority list (i.e. receiver 2 has receiver 1 listed at the top, receiver 3 has receiver 2 listed at the top, and so on). In this case, only link 1 is able to be scheduled, which can be highly suboptimal. A second iteration can improve the process when incompatible lists are checked and receivers can jump ahead, but the process can still be far from optimal spatial reuse.

In accordance with an embodiment of the present invention, rather than continuing to follow the same procedure in each iteration, a new procedure can be implemented in the last ($n^{th}$ iteration) of the bandwidth grant messages. Operations during iterations j=1, . . . , n−1 are the same as described in the preceding paragraphs. For the last iteration, j=n, a tentative grant can be transmitted by all receivers that did not get a chance to send a bandwidth grant during the first n−1 iterations. The receiver UE can tentative grant the channel if the SIR threshold at the receiver for its own signal is satisfied. This interference corresponds to the other higher priority links that are already granted or not deemed incompatible by other bandwidth grants. In this example, the transmitter can be configured to make a final decision on whether to transmit or not based on all bandwidth grants. The transmitter will not transmit if it is deemed incompatible by a higher priority link.

The bandwidth grant can be communicated at full power. Transmission at full power provides a high probability that if a transmitter is incompatible (i.e. has a SIR that is less than a selected threshold with a receiver having a higher priority), the incompatible list communicated in the bandwidth grant message reaches the transmitter to indicate that a receiver is shutting down the transmitter down.

With regard to grant messages, there are multiple ways to implement these enhanced messages or grant/disable messages as disclosed. For example, as discussed above, enhancements or changes to the tone matrix (see FIG. 2) proposed in FlashLinQ may be used to provide the grant and block indications. Specifically, in FlashLinQ, the frequency tones in the grant message are mapped to link identifiers (IDs) uniquely, and the tones are arranged in priority in a logical domain. For each grant message, only the tone corresponding to the granted link has power on it. All the other tones have no power. In contrast, one embodiment of the enhanced scheme carries more information on the same set of tones. Besides sending power on the granted link, the granting receiver also sends power on the tones corresponding to the links that would cause strong interference to the granted link (e.g., the links identified by the interference component 408). The power on the tones of the incompatible links indicates that those links are disabled. Since the granted link has the highest priority among all unscheduled links perceived by the granting receiver, the tones of the disabled links are always below the granted link's tone. Therefore, the first set tone in the tone matrix sorted by priority is interpreted as the granted tone, and the other set tones below in priority are interpreted as the disabled tones.

In the nth iteration, the tentative grant can be communicated to all receivers that did not send a bandwidth grant in the first n−1 iterations, as previously discussed. If the SIR threshold at the receiver for its own signal is satisfied, then a grant signal can be communicated from the receiver to the transmitter. The transmitter can then determine, based on the incompatible list in the bandwidth grants, that it can transmit if the transmitter is not deemed incompatible by a higher priority link.

The embodiment with the tentative grant has been simulated for n=1, 2, 3, and 10 iterations, corresponding to n bandwidth grant slots and compared with a genie-aided scheduling that is used as a theoretical upper bound. The genie, by definition, can make yielding decisions for each link available at all of the transmitters and receivers in the network. Thus, if a link is yielding to a higher priority receiver, the genie makes this decision visible to all of the other UEs in the network. Consequently, a link will yield only if the higher priority receiver it is yielding to is getting scheduled. This provides an upper bound for cell average throughput that can be achieved using distributed schemes.

In the simulation, several parameters were selected. A cellular deployment has been simulated with 1 tier f interference (21 cells) with an inter-site distance of 500 meters. The deployment is also wrapped around for a more accurate interference modeling. The UE D2D pairs are uniformly located in the macro cell area. The UE pair distance is a uniform random variable between 1 and 50 meters. When scheduled, a D2D pair uses the whole bandwidth available, such as 50 physical resource blocks (PRBs) to transmit the data. An LTE power control algorithm is used with a fractional coefficient of unity and a target signal to noise ratio (SNR) of 15 decibels (dB). The channel model is the heuristic ITU-P14.11-6 channel model.

The cell average throughput has been plotted as a function of the number of device to device (D2D) pairs per cell relative to the cell average throughput. When enhancing the method described in FIG. 4 with the use of the tentative grant, as previously discussed, a significant improvement in the results occurs. In fact, the result teaches to within 1% of the upper bound with just 2 iterations in most cases. The improvement in performance is dramatic with a single iteration (n=1). For a large number of D2D UE pairs per cell, a greater number of iterations may be needed to achieve throughput close to the upper bound. The number of iterations, n, may be selected based on the desired throughput relative to the upper bound.

Figure 8:
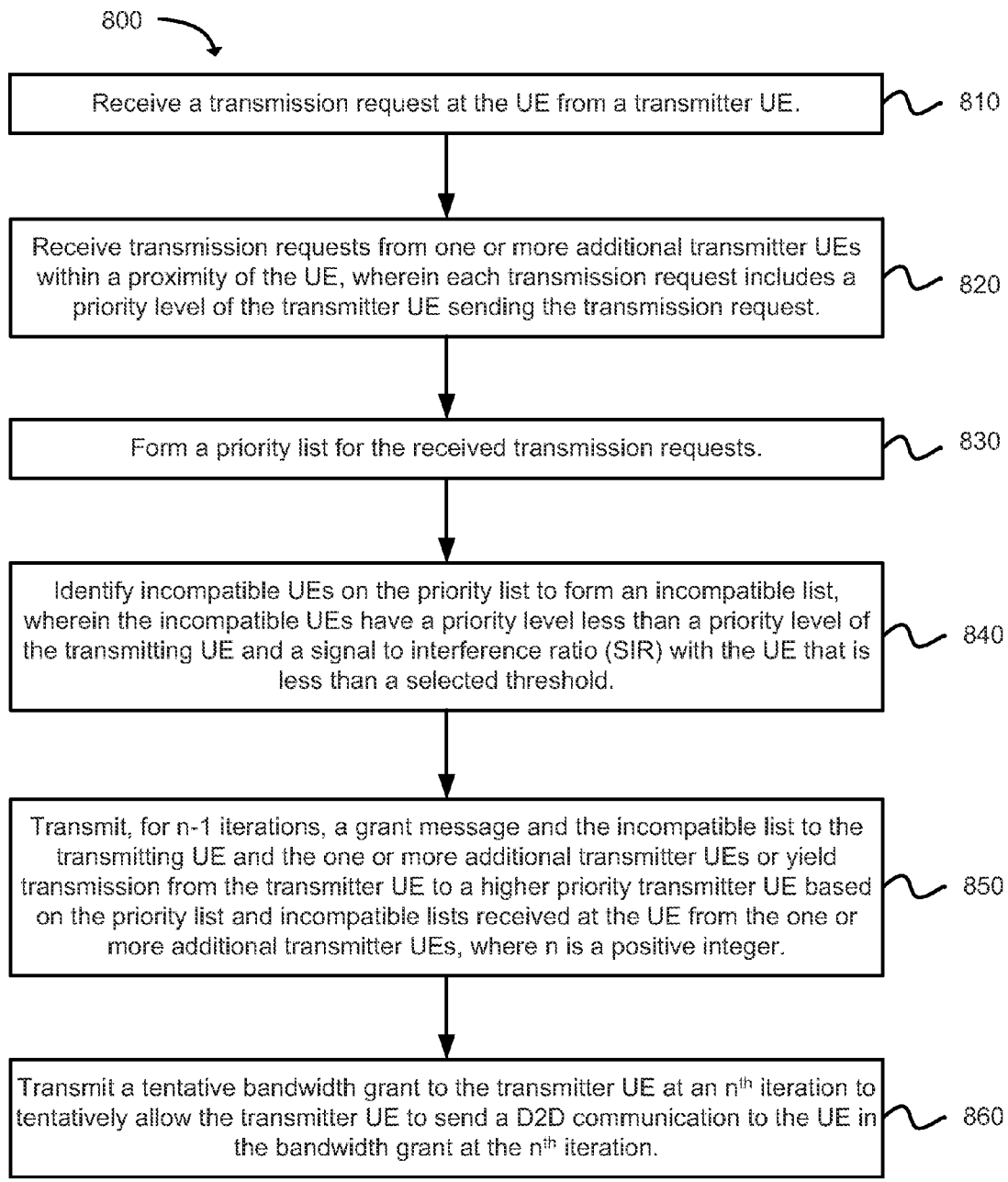
FIG. 8 illustrates a flow chart depicting functionality of a user equipment (UE) configured for device to device (D2D) communications in accordance with examples disclosed herein.

Another example provides functionality 800 of a user equipment (UE) configured for device to device (D2D) communications, as shown in the flow chart of FIG. 8. The functionality can be implemented as a method or the functionality can be executed as instructions on a machine, where the instructions are included on at least one computer readable medium or one non-transitory machine readable storage medium. The UE can have one or more processors that are configured to receive a transmission request at the UE from a transmitter UE, as shown in block 810. The one or more processors can receive transmission requests from one or more additional transmitter UEs, as shown in block 820. Each transmission request can include a priority level of the transmitter UE sending the transmission request. In one embodiment, the priority level can be selected based on requirements of each UE, such as a quality of service (QOS), the type of information communicated, the bandwidth of the UE, and so forth. Alternatively, the priority may be randomly selected and assigned to each UE transmitter and UE receiver forming a D2D pair to communicate over a D2D link within proximity of the UE.

The flow chart of FIG. 8 further comprises using the one or more processors to form a priority list for the received transmission requests, as in block 830. The one or more processors can also identify incompatible UEs on the priority list to form an incompatible list, as in block 840. The incompatible UEs have a priority level less than a priority level of the transmitting UE and a signal to interference ratio (SIR) with the UE that is less than a selected threshold. The one or more processors can be configured to transmit, for n−1 iterations, a grant message and the incompatible list to the transmitting UE and the one or more additional transmitter UEs. Alternatively, the one or more processors can be configured to yield transmission from the transmitter UE to a higher priority transmitter UE based on the priority list and incompatible lists received at the UE from the one or more additional transmitter UEs, where n is a positive, non-zero integer, as shown in block 850. The one or more processors can be further configured to transmit a tentative bandwidth grant to the transmitter UE at an $n^{th}$ iteration to tentatively allow the transmitter UE to send a D2D communication to the UE in the bandwidth grant at the $n^{th}$ iteration, as shown in block 860.

In another example, the one or more processors of the UE can be further configured to receive the D2D communication from the transmitter UE within the tentative bandwidth grant when the transmitter UE is not incompatible with the one or more additional transmitter UEs with a greater priority level than the transmitter UE. The one or more processors can be configured to receive the D2D communication from the transmitter UE within the tentative bandwidth grant when the transmitter UE is not incompatible with the one or more additional transmitter UEs having a greater priority level than the transmitter UE and that has not received a grant message.

The one or more processors of the UE can be further configured to receive the D2D communication from the transmitter UE within the tentative bandwidth grant when the transmitter UE has not received a bandwidth grant in the n−1 iterations. The one or more processors can be further configured to transmit the tentative bandwidth grant to the transmitter UE at a full power level. In one example, n can be set to two to provide two iterations of the bandwidth grant messages. Alternatively, n can be set to a value of 1 or a value greater than 2, such as 3, 4, 5, and so forth up to a value of 20 or more. The one or more processors can be further configured to select a value of n to provide a desired average cell transmission throughput for a cell relative to an upper bound. For example, the value of n may be selected so that there is a difference of less than 5%, 4%, 3%, 2% or 1% between the cell average throughput for a number of UE pairs per cell, and an upper bound, such as a genie aided upper bound.

Figure 9:
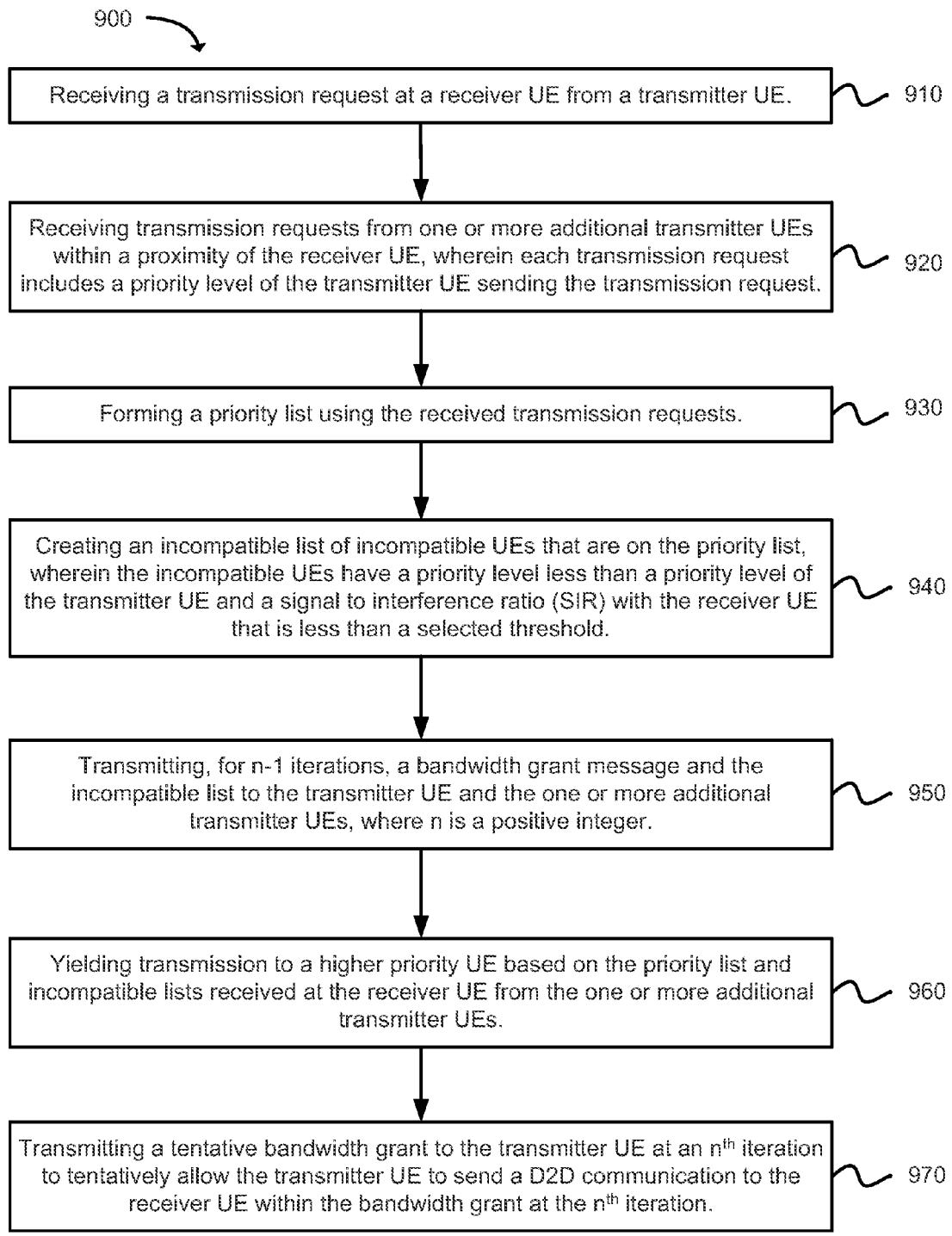
FIG. 9 depicts a flowchart of a method for distributed scheduling in a device to device (D2D) network in accordance with examples disclosed herein.

In another example, a method 900 for distributed scheduling in a device to device (D2D) network is illustrated in the flow chart of FIG. 9. The method comprises the operation of receiving a transmission request at a receiver UE from a transmitter UE, as shown in block 910. A transmission request can be received from one or more additional transmitter UEs, as shown in block 920. Each transmission request can include a priority level of the transmitter UE sending the transmission request. The method further comprises forming a priority list using the received transmission requests, as shown in block 930. An incompatible list of incompatible UEs that are listed on the priority list can be created, as in block 940. The incompatible UEs can have a priority level less than a priority level of the transmitter UE and a signal to interference ratio (SIR) with the receiver UE that is less than a selected threshold.

The method 900 can further comprise transmitting, for n−1 iterations, a bandwidth grant message and the incompatible list to the transmitter UE and the one or more additional transmitter UEs, where n is a positive non-zero integer, as shown in block 950. Alternatively, the UE can yield transmission to a higher priority UE based on the priority list and incompatible lists received at the receiver UE from the one or more additional transmitter UEs, as shown in 960. A tentative bandwidth grant can be transmitted from the receiver UE to the transmitter UE at an $n^{th}$ iteration to tentatively allow the transmitter UE to send a D2D communication to the receiver UE within the bandwidth grant at the $n^{th}$ iteration, as shown in 970.

The method 900 can further comprise receiving the D2D communication from the transmitter UE within the tentative bandwidth grant when the transmitter UE is not incompatible with the one or more additional transmitter UEs that have a greater priority level than the transmitter UE. In another operation, the method can comprise receiving the D2D communication from the transmitter UE within the tentative bandwidth grant when the transmitter UE is not incompatible with the one or more additional transmitter UEs that have a greater priority level than the transmitter UE and that have not received a grant message. The method can further comprise receiving the D2D communication from the transmitter UE within the tentative bandwidth grant when the transmitter UE has not received a bandwidth grant in the n−1 iterations.

The method 900 can further comprise transmitting the tentative bandwidth grant to the transmitter UE at a full power level to enable the one or more additional transmitter UEs to receive the tentative bandwidth grant. The bandwidth grant can be transmitted for n−1 iterations, where n=2. Alternatively, another value of n can be selected, such as 1, 2, 3, 4, 5, and so forth, up to a value of 20 or more. In one embodiment, a value of n can be selected to provide a desired average cell transmission throughput for a cell relative to a theoretical upper bound for throughput in the cell.

Figure 10:
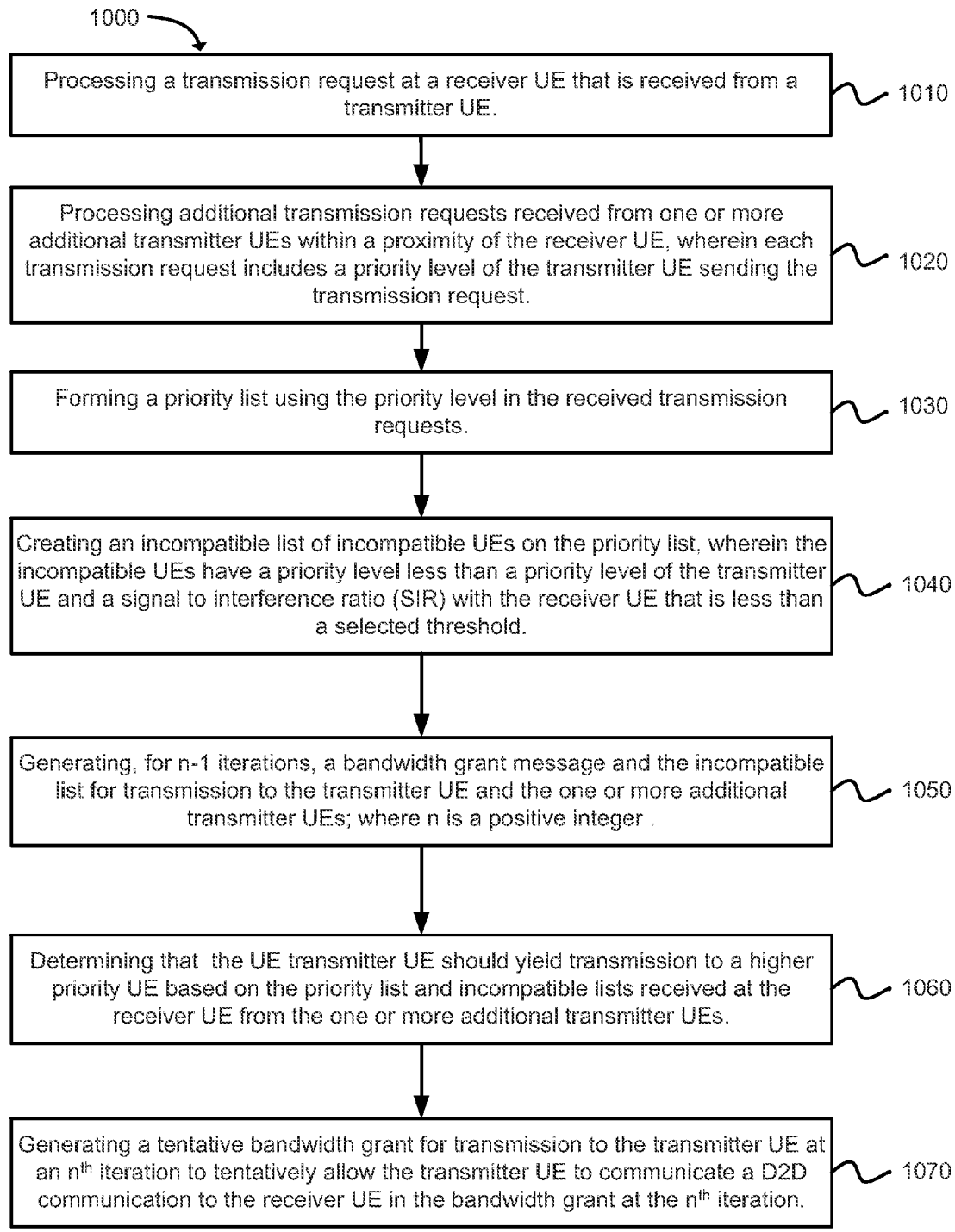
FIG. 10 illustrates a flow chart depicting functionality to provide distributed scheduling in a device to device (D2D) network in accordance with examples disclosed herein.

Another example provides a non-transitory machine readable storage medium having instructions 1000 embodied thereon, the instructions which when executed by one or more processors perform the following operations to provide distributed scheduling in a device to device (D2D) network, as shown in the flow chart of FIG. 10. The operations comprise: processing a transmission request at a receiver UE that is received from a transmitter UE, as in block 1010; processing additional transmission requests received from one or more additional transmitter UEs, wherein each transmission request includes a priority level of the transmitter UE sending the transmission request, as in block 1020; forming a priority list using the priority level in the received transmission requests, as in block 1030; creating an incompatible list of incompatible UEs on the priority list, wherein the incompatible UEs have a priority level less than a priority level of the transmitter UE and a signal to interference ratio (SIR) with the receiver UE that is less than a selected threshold, as in block 1040; generating, for n−1 iterations, a bandwidth grant message and the incompatible list for transmission to the transmitter UE and the one or more additional transmitter UEs; where n is a positive integer as in block 1050; or alternatively determining that the UE transmitter UE should yield transmission to a higher priority UE based on the priority list and incompatible lists received at the receiver UE from the one or more additional transmitter UEs, as in block 1060; and generating a tentative bandwidth grant for transmission to the transmitter UE at an $n^{th}$ iteration to tentatively allow the transmitter UE to communicate a D2D communication to the receiver UE in the bandwidth grant at the $n^{th}$ iteration, as in block 1070.

The at least one non-transitory machine readable storage medium can further comprise instructions, which, when executed by the one or more processors, comprise processing the D2D communication communicated from the transmitter UE within the tentative bandwidth grant when the transmitter UE is not incompatible with the one or more additional transmitter UEs that have a greater priority level than the transmitter UE; and/or processing the D2D communication from received the transmitter UE within the tentative bandwidth grant when the transmitter UE is not incompatible with the one or more additional transmitter UEs that have a greater priority level than the transmitter UE and that have not received a grant message.

The at least one non-transitory machine readable storage medium can further comprise instructions, which, when executed by the one or more processors, comprise processing the D2D communication received from the transmitter UE within the tentative bandwidth grant when the transmitter UE has not received a bandwidth grant in the n−1 iterations; and/or instructing the tentative bandwidth grant to be transmitted from the receiver UE to the transmitter UE at a full power level to enable the one or more additional transmitter UEs to receive the tentative bandwidth grant.

The at least one non-transitory machine readable storage medium can further comprise instructions, which, when executed by the one or more processors, comprise setting the number of iterations for the bandwidth grant to be generated to a value of n=2; and/or selecting a value of n to provide a desired average cell transmission throughput for a cell relative to a theoretical upper bound for throughput in the cell.

Figure 11:
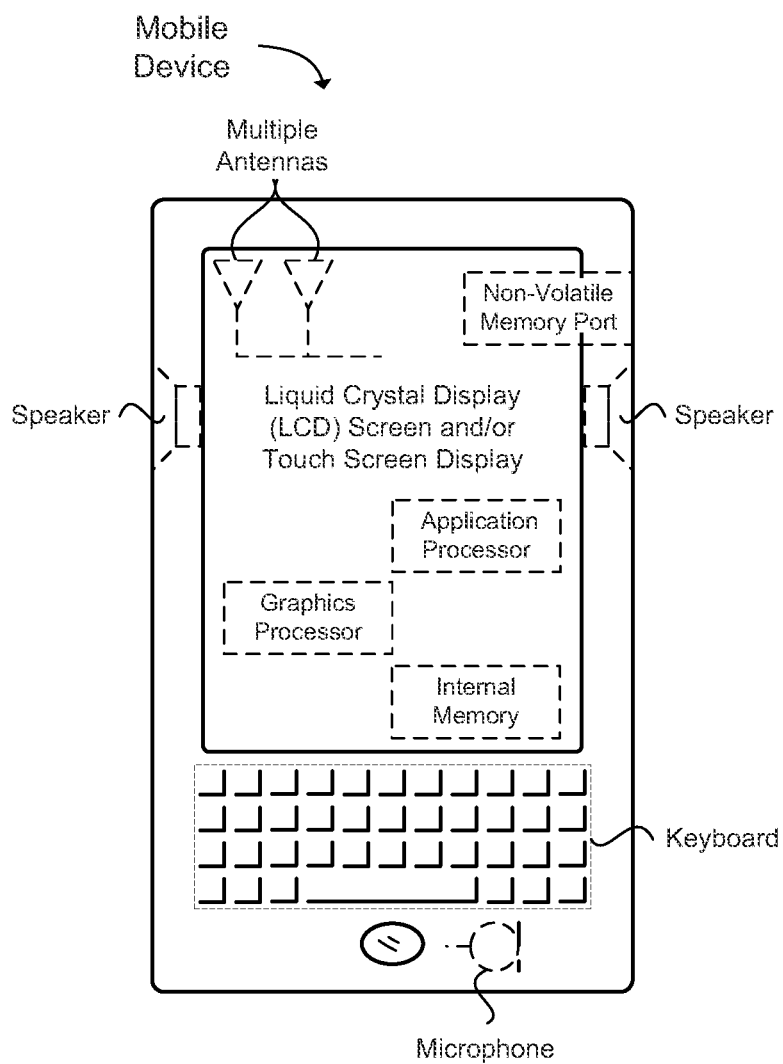
FIG. 11 illustrates a diagram of a wireless device (e.g., UE) in accordance with an example.

FIG. 11 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 11 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

Various techniques, or certain aspects or portions thereof, can take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a RAM, EPROM, flash drive, optical drive, magnetic hard drive, solid state drive, or other medium for storing electronic data. The node and wireless device can also include a transceiver module, a counter module, a processing module, and/or a clock module or timer module. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

It should be understood that many of the functional units described in this specification have been labeled as modules, in order to more particularly emphasize their implementation independence. For example, a module can be implemented as a hardware circuit comprising custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits can be used to implement the functional units described in this specification. For example, a first hardware circuit can be used to perform processing operations and a second hardware circuit (e.g., a transceiver) can be used to communicate with other entities. The first hardware circuit and the second hardware circuit can be integrated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A user equipment (UE) configured for device to device (D2D) communications, the UE having one or more processors configured to:
receive a transmission request at the UE from a transmitter UE;
receive transmission requests from one or more additional transmitter UEs, wherein each transmission request includes a priority level of the one or more additional transmitter UEs sending the transmission request;
form a priority list for the received transmission requests;
identify incompatible UEs on the priority list to form an incompatible list, wherein the incompatible UEs have a priority level less than a priority level of the transmitter UE and a signal to interference ratio (SIR) with the UE that is less than a selected threshold;
transmit, for n-1 iterations, a grant message and the incompatible list to the transmitter UE and the one or more additional transmitter UEs or yield transmission from the transmitter UE to a higher priority transmitter UE based on the priority list and incompatible lists received at the UE from the one or more additional transmitter UEs, where n is a positive integer; and
transmit a tentative bandwidth grant to the transmitter UE at an $n^{th}$ iteration to tentatively allow the transmitter UE to send a D2D communication to the UE in the tentative bandwidth grant at the $n^{th}$ iteration.

2. The UE of claim 1, wherein the one or more processors are further configured to receive the D2D communication from the transmitter UE within the tentative bandwidth grant when the transmitter UE is not incompatible with the one or more additional transmitter UEs, wherein the one or more additional transmitter UEs have a greater priority level than the transmitter UE.

3. The UE of claim 1, wherein the one or more processors are further configured to receive the D2D communication from the transmitter UE within the tentative bandwidth grant when the transmitter UE is not incompatible with the one or more additional transmitter UEs, wherein the one or more additional transmitter UEs have a greater priority level than the transmitter UE that has not received a grant message.

4. The UE of claim 1, wherein the one or more processors are further configured to receive the D2D communication from the transmitter UE within the tentative bandwidth grant when the transmitter UE has not received a bandwidth grant in the n-1 iterations.

5. The UE of claim 1, wherein the one or more processors are further configured to transmit the tentative bandwidth grant to the transmitter UE at a full power level.

6. The UE of claim 1, wherein n=2.

7. The UE of claim 1, wherein the one or more processors are further configured to select a value of n to provide a desired average cell transmission throughput for a cell relative to an upper bound.

8. A method for distributed scheduling in a device to device (D2D) network, the method comprising:
receiving a transmission request at a receiver UE from a transmitter UE;
receiving transmission requests from one or more additional transmitter UEs, wherein each transmission request includes a priority level of the transmitter UE sending the transmission request;
forming a priority list using the received transmission requests;
creating an incompatible list of incompatible UEs that are on the priority list, wherein the incompatible UEs have a priority level less than a priority level of the transmitter UE and a signal to interference ratio (SIR) with the receiver UE that is less than a selected threshold;
transmitting, for n-1 iterations, a bandwidth grant message and the incompatible list to the transmitter UE and the one or more additional transmitter UEs, where n is a positive integer; or
yielding transmission to a higher priority UE based on the priority list and incompatible lists received at the receiver UE from the one or more additional transmitter UEs; and
transmitting a tentative bandwidth grant to the transmitter UE at an $n^{th}$ iteration to tentatively allow the transmitter UE to send a D2D communication to the receiver UE within the bandwidth grant at the $n^{th}$ iteration.

9. The method of claim 8, further comprising receiving the D2D communication from the transmitter UE within the tentative bandwidth grant when the transmitter UE is not incompatible with the one or more additional transmitter UEs, wherein the one or more additional transmitter UEs have a greater priority level than the transmitter UE.

10. The method of claim 8, further comprising receiving the D2D communication from the transmitter UE within the tentative bandwidth grant when the transmitter UE is not incompatible with the one or more additional transmitter UEs, wherein the one or more additional transmitter UEs have a greater priority level than the transmitter UE that has not received a grant message.

11. The method of claim 8, further comprising receiving the D2D communication from the transmitter UE within the tentative bandwidth grant when the transmitter UE has not received a bandwidth grant in the n-1 iterations.

12. The method of claim 8, further comprising transmitting the tentative bandwidth grant to the transmitter UE at a full power level to enable the one or more additional transmitter UEs to receive the tentative bandwidth grant.

13. The method of claim 8, further comprising transmitting the bandwidth grant for n-literations, wherein n=2.

14. The method of claim 8, further comprising selecting a value of n to provide a desired average cell transmission throughput for a cell relative to a theoretical upper bound for throughput in the cell.

15. A non-transitory machine readable storage medium having instructions embodied thereon, the instructions which when executed by one or more processors perform the following operations to provide distributed scheduling in a device to device (D2D) network, the operations comprising:
   processing a transmission request at a receiver UE that is received from a transmitter UE;
   processing additional transmission requests received from one or more additional transmitter UEs, wherein each transmission request includes a priority level of the transmitter UE sending the transmission request;
   forming a priority list using the priority level in the received transmission requests;
   creating an incompatible list of incompatible UEs on the priority list, wherein the incompatible UEs have a priority level less than a priority level of the transmitter UE and a signal to interference ratio (SIR) with the receiver UE that is less than a selected threshold;
   generating, for n−1 iterations, a bandwidth grant message and the incompatible list for transmission to the transmitter UE and the one or more additional transmitter UEs; where n is a positive integer; or
   determining that the UE transmitter UE should yield transmission to a higher priority UE based on the priority list and incompatible lists received at the receiver UE from the one or more additional transmitter UEs; and
   generating a tentative bandwidth grant for transmission to the transmitter UE at an $n^{th}$ iteration to tentatively allow the transmitter UE to communicate a D2D communication to the receiver UE in the bandwidth grant at the $n^{th}$ iteration.

16. The at least one non-transitory machine readable storage medium of claim 15, further comprising instructions, which, when executed by the one or more processors, comprise processing the D2D communication communicated from the transmitter UE within the tentative bandwidth grant when the transmitter UE is not incompatible with the one or more additional transmitter UEs, wherein the one or more additional transmitter UEs have a greater priority level than the transmitter UE.

17. The at least one non-transitory machine readable storage medium of claim 15, further comprising instructions, which, when executed by the one or more processors, comprise processing the D2D communication from received the transmitter UE within the tentative bandwidth grant when the transmitter UE is not incompatible with the one or more additional transmitter UEs, wherein the one or more additional transmitter UEs have a greater priority level than the transmitter UE that has not received a grant message.

18. The at least one non-transitory machine readable storage medium of claim 15, further comprising instructions, which, when executed by the one or more processors, comprise processing the D2D communication received from the transmitter UE within the tentative bandwidth grant when the transmitter UE has not received a bandwidth grant in the n−1 iterations.

19. The at least one non-transitory machine readable storage medium of claim 15, further comprising instructions, which, when executed by the one or more processors, comprise instructing the tentative bandwidth grant to be transmitted from the receiver UE to the transmitter UE at a full power level to enable the one or more additional transmitter UEs to receive the tentative bandwidth grant.

20. The at least one non-transitory machine readable storage medium of claim 15, further comprising setting the number of iterations for the bandwidth grant to be generated to a value of n=2.

21. The at least one non-transitory machine readable storage medium of claim 15, further comprising selecting a value of n to provide a desired average cell transmission throughput for a cell relative to a theoretical upper bound for throughput in the cell.

\* \* \* \* \*